G. O. GRAY.
DECIMAL POINT DEVICE FOR CHART READERS.
APPLICATION FILED FEB. 3, 1921.
1,420,695.
Patented June 27, 1922.
2 SHEETS—SHEET 1.
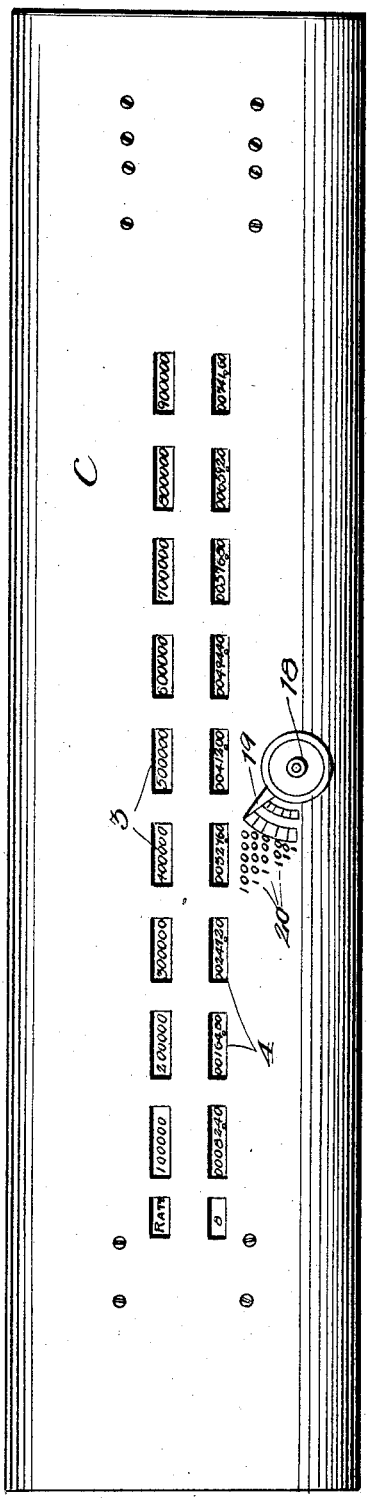
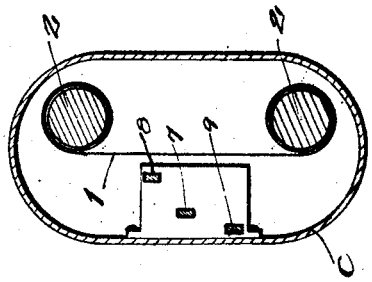
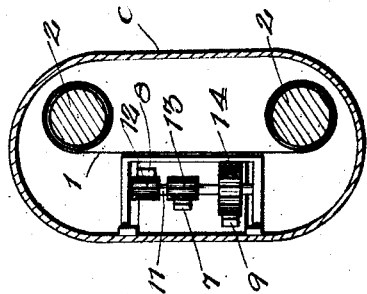
WITNESSES
INVENTOR
G. O. GRAY,
BY
ATTORNEYS

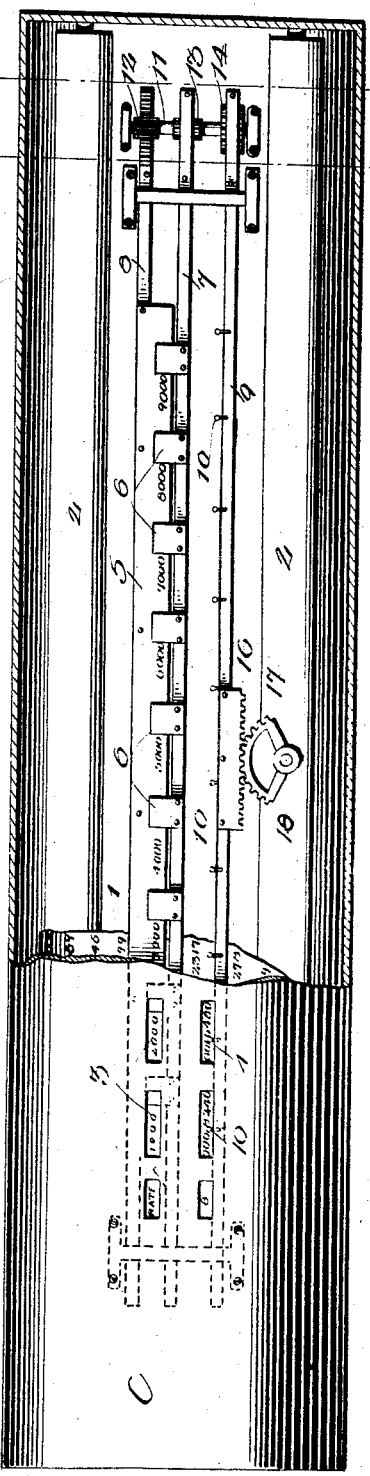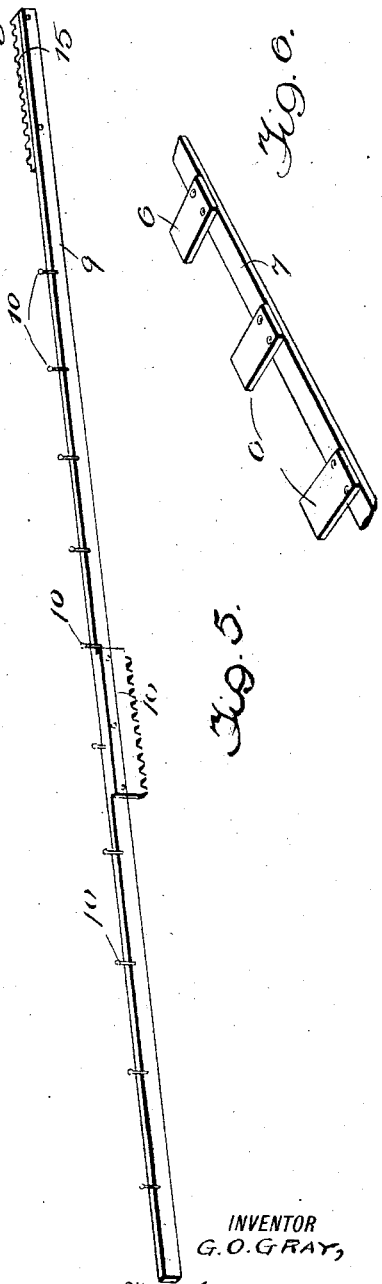

UNITED STATES PATENT OFFICE.

GEORGE ORIE GRAY, OF BUTTE, MONTANA.

DECIMAL-POINT DEVICE FOR CHART READERS.

1,420,695.  Specification of Letters Patent.  Patented June 27, 1922.

Application filed February 3, 1921. Serial No. 442,135.

*To all whom it may concern:*

Be it known that I, GEORGE O. GRAY, a citizen of the United States, and a resident of Butte, in the county of Silverbow and State of Montana, have invented certain new and useful Improvements in Decimal-Point Devices for Chart Readers, of which the following is a specification.

My invention is an improvement in moving decimal point devices for chart readers, and has for its object to provide mechanism in connection with chart exhibiting devices, for facilitating the reading of the chart.

In the drawings:

Figure 1 is a plan view of a chart exhibiting mechanism provided with the improved decimal point mover, Figure 2 is a similar view with the case in section, Figures 3 and 4 are sections on the lines 3—3 and 4—4, respectively, of Figure 2, Figure 5 is a perspective view of the point bar, Figure 6 is a similar view of a portion of the covering bar.

In the present embodiment of the invention, the chart 1 is mounted upon rollers 2 which are journaled longitudinally of a suitable supporting case C, the chart 1 winding upon the rollers at its ends, and suitable mechanism is provided for operating the rollers to wind the chart from one to the other.

The face of the chart is moved past two series of observation openings 3 and 4, the openings of each series registering, and the corresponding openings being of the same size as shown. The indications on the chart are observed through the openings 4, and the pointing mechanism is provided for facilitating the reading of the chart.

Through the openings 3, the indications on a plate 5 are read, the said indications being series of numerals. In the first opening 3 there appears the fixed word "Rate," and in the succeeding openings appear series of numerals from 100,000 to 900,000 which is on the plate 5.

Certain of the naughts in these series of numerals are adapted to be covered by covering plates 6. These plates 6 are secured to a bar 7 which is movable longitudinally of the case, to simultaneously cover one or more of the naughts at the right end of each opening 3.

The plate 5 is also secured to a bar 8 similar to the bar 7, and a third bar 9 is arranged in the case to be moved longitudinally thereof, parallel with the bars 7 and 8, and this bar 9 carries decimal points 10. Each of these points is on the end of a pin which is secured to the bar, and extends laterally therefrom.

These pins are spaced apart a distance corresponding to the spacing of the openings 4, and the points appear in the openings between the numerals of the indications on the chart. A shaft 11 is journaled at one end of the casing transversely of the bars 8—7—9, and this shaft has a pinion for each bar, the pinions being designated at 12, 13 and 14, respectively.

Each of the bars has a rack bar 15 secured to that end which is adjacent to the shaft, and these rack bars are engaged by the pinions. A rack bar 16 is secured to the bar 9 intermediate its ends, and this bar is engaged by the teeth of a gear segment 17 secured to a shaft 18 journaled in the case and extending through the wall thereof, and having at its outer end an indicating point 19.

This point cooperates with a scale 20 on the case, and when for instance, the indicator is opposite the indication 100,000, on the scale, all of the plates 6 will be clear of the openings 3, so that the series of numerals at the openings 3 will read from 100,000 to 900,000.

When the indicator is moved to the indication 1 on the scale for instance, the bar 9 will be moved longitudinally and the shaft 11 will be rotated because of the engagement between the rack bar on the bar 9 and the pinion 14. The bars 7 and 8 will be moved by the shaft, and since they are oppositely arranged with respect to the shaft, the rack bar of the bar 7 being above the shaft, while that of the bar 8 is below the shaft, they will be moved in opposite directions.

In that opening 4 which is farthest to the left in Figure 2, that indication on the chart appears which indicates the rate. As illustrative of the use of the device it might be assumed that it is desired to ascertain the shipping cost of ten thousand pounds of goods at 8¢ per (100) cwt. plus 3% war tax. In this case, the chart wound about the roll 2 is turned until the 8 appears under "Rate" in opening for that purpose. The indicator 19 is now adjusted to the 10,000 point so that the reading in the opening 3 will be 10,000 and the opening under this 10,000 just referred to will display the following number: 00082.40 or $82.40. This $82.40 represents the shipping cost of 10,000 lbs. of goods at 8¢ per cwt. plus 3% war tax.

As a further illustration of the use of this device, it might be assumed that it is desired to ascertain the cost of 3,000 lbs. of goods at 13¢ per cwt. plus 3% war tax. In that case, the third sight opening #3 will be caused to display the number 3,000 by the proper longitudinal movement of the member 7. By moving the chart so that the rate 13 appears in the first sight opening 4, the number directly beneath the number 3,000 will read as follows: 004.0170 or $4.017. Therefore it will be seen that $4.017 is the freight rate on 3,000 lbs. of goods at 13¢ per cwt. plus 3% war tax.

The device can be used on a variety of charts such as pay rolls, interest, bushels, assessments, etc.

I claim:—

1. The combination with a chart and rollers supporting the same, of a data bearing plate of elongated formation having one end provided with a rack, a shaft having a pinion engaging said rack, and a bar having covering plates adapted to partially conceal the data on said plate, said bar being provided with a rack, a second pinion secured on said shaft and engaging said second named rack, and an operating rod connected with said shaft.

2. The combination with a chart and rollers supporting the same, of a data bearing plate of elongated formation having one end provided with a rack, a shaft having a pinion engaging said rack, a bar having covering plates adapted to partially conceal the data on said plate, said bar being provided with a rack, a second pinion secured on said shaft and engaging said second named rack, an operating rod connected with said shaft, and means to move said operating rod longitudinally.

GEORGE ORIE GRAY.